United States Patent [19]

Rao et al.

[11] Patent Number: 5,758,496
[45] Date of Patent: Jun. 2, 1998

[54] PARTICULATE AND EXHAUST GAS EMISSION CONTROL SYSTEM

[75] Inventors: Vemulapalli D. N. Rao, Bloomfield Township, Mich.; Harry A. Cikanek, Northville, Mich.

[73] Assignee: Ford Global Technologies, Inc., Dearborn, Mich.

[21] Appl. No.: 603,511

[22] Filed: Feb. 20, 1996

Related U.S. Application Data

[63] Continuation of Ser. No. 952,274, Sep. 28, 1992, abandoned.

[51] Int. Cl.$^6$ .................................................. F01N 3/28
[52] U.S. Cl. .......................... 66/295; 60/297; 60/299; 422/169; 422/180
[58] Field of Search ............................ 60/297, 299, 295; 422/169, 180; 55/523, DIG. 30

[56] References Cited

U.S. PATENT DOCUMENTS

| | | | |
|---|---|---|---|
| 4,538,411 | 9/1985 | Wade et al. | 60/274 |
| 4,544,388 | 10/1985 | Rao et al. | 55/282 |
| 4,596,277 | 6/1986 | Djordjevic | 141/100 |
| 4,621,593 | 11/1986 | Rao et al. | 123/1 |
| 4,655,037 | 4/1987 | Rao | 60/274 |
| 4,669,261 | 6/1987 | Wörner et al. | 422/171 |
| 4,670,020 | 6/1987 | Rao | 44/57 |
| 4,728,503 | 3/1988 | Iida | 422/169 |
| 4,759,918 | 7/1988 | Homeier | 55/523 |
| 4,857,089 | 8/1989 | Kitagawa et al. | 422/180 |
| 5,089,237 | 2/1992 | Schuster et al. | 422/180 |
| 5,094,074 | 3/1992 | Nishizawa et al. | 60/299 |
| 5,100,632 | 3/1992 | Dettling | 55/523 |
| 5,104,627 | 4/1992 | Usui et al. | 60/299 |
| 5,213,781 | 5/1993 | Abe | 423/213.2 |
| 5,229,078 | 7/1993 | Haerle | 422/180 |
| 5,248,481 | 9/1993 | Bloom et al. | 60/299 |
| 5,402,639 | 4/1995 | Fleck | 60/275 |

FOREIGN PATENT DOCUMENTS

| | | |
|---|---|---|
| 0 056 584 | 7/1982 | European Pat. Off. . |
| 61-129016 | 6/1986 | European Pat. Off. . |
| 0 470 365 | 2/1992 | European Pat. Off. . |
| 2668203 | 10/1990 | France . |
| 3923985 | 7/1989 | Germany . |
| 40 05 189 | 8/1990 | Germany . |
| 4028253 | 9/1990 | Germany . |

OTHER PUBLICATIONS

Patent Abstracts of Japan / Public. No. JP56148607, Public. Date: 18 Nov. 1981; Application No. JP800050255, Applic. Date: 18 Apr. 1980.

*Primary Examiner*—Douglas Hart
*Attorney, Agent, or Firm*—Lorraine S. Melotik; Roger L. May

[57] ABSTRACT

A particulate and exhaust emission control system for a vehicle (10) having a diesel engine (12). The control system has a particulate trap (24) connected to the exhaust manifold (22) of the diesel engine, an additive tank (30) for storing a fuel additive decomposed by the engine's combustion process to form a reducible metal oxide capable of depressing the ignition temperature of the carbon particulates collected by the particulate trap (24) and a metering mechanism (34) responsive to the adding of diesel fuel to the vehicle's fuel tank (28) to add a quantity of the fuel additive to the diesel fuel in the fuel tank (28) to maintain a predetermined ratio of the fuel additive to the diesel fuel in the tank. The metal oxide depressing the ignition temperature of the carbon particulates collected by the particulate trap (24) to a temperature obtained by the particulate trap during selected operating parameters of the diesel engine (12). The particulate trap (24) includes a honeycomb ceramic filter element (38) having inlet channels (44) for collecting the carbon particulate and exit channels (46) coated with a catalyst to oxidize carbon monoxide and unburned hydrocarbons in the exhaust.

31 Claims, 6 Drawing Sheets

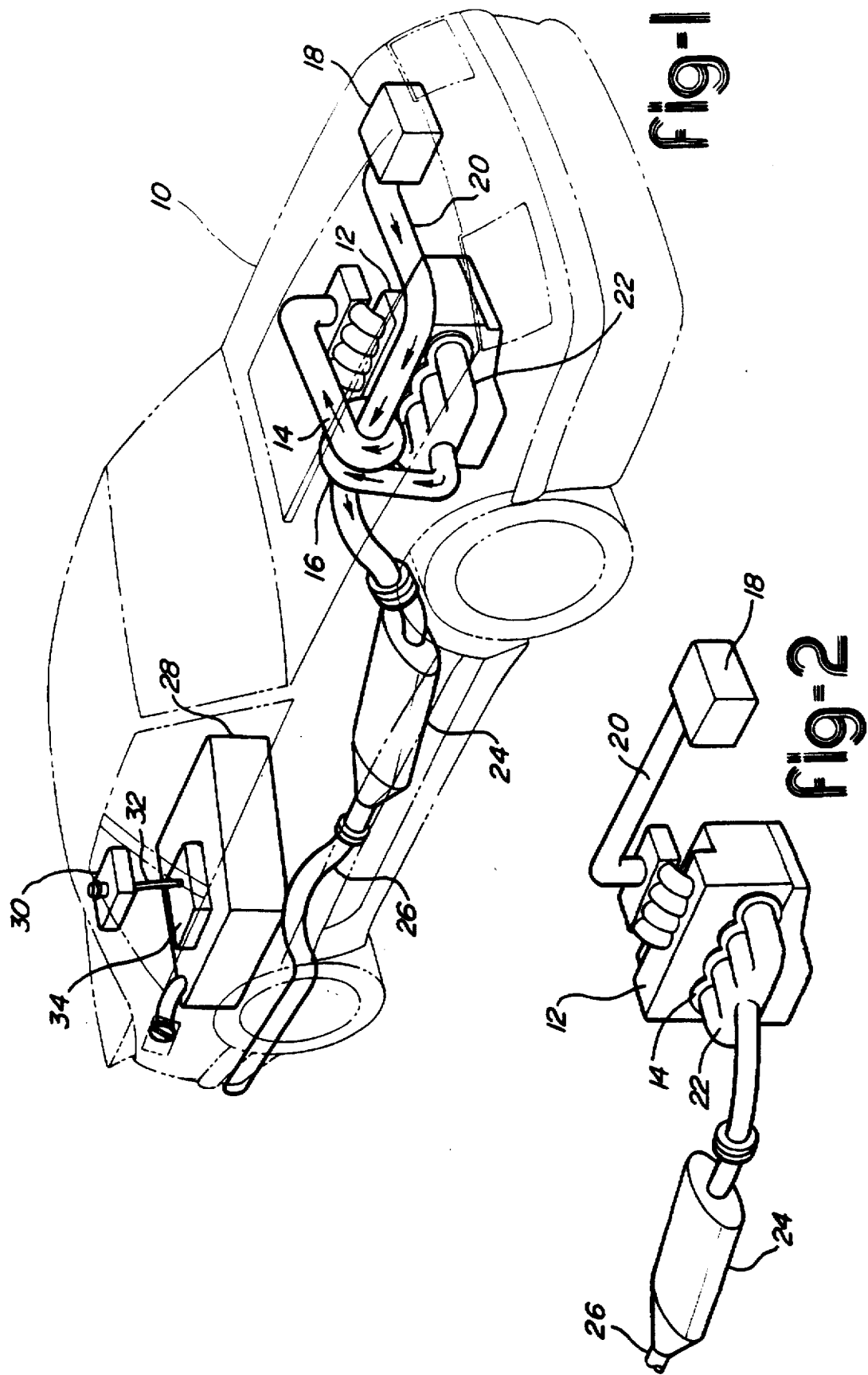

PARTICULATE AND EXHAUST GAS EMISSION CONTROL SYSTEM

This is a continuation of application(s) Ser. No. 07/952, 274, filed on Sep. 28, 1992 now abandoned.

TECHNICAL FIELD

The invention is related to emission control systems for internal combustion engines and in particular to a particulate and exhaust gas emission control system for a diesel engine.

BACKGROUND ART

The 1994 Federal and California Air Resources Board (CARB) requirements substantially reduce the carbon particulate, hydrocarbons and carbon monoxide emission for light duty diesel engines. Wade et al in U.S. Pat. No. 4,538,441 and Rao et al in U.S. Pat. No. 4,544,388 teach the use of a monolithic honeycomb ceramic trap to collect the carbon particulates emitted from a diesel engine then heating an air flow through the ceramic trap using an electric heater to a temperature sufficient to ignite the collected carbon particulates. Rao in U.S. Pat. Nos. 4,655,037 and 4,670,020 teaches the use of one or more metal octoates added to diesel fuel to produce a reducible metal oxide which reduces the ignition temperature of the collected carbon particles to a range from 250° C. to 310° C. Rao et al in U.S. Pat. No. 4,621,593 describes an apparatus for dispensing the octoate additive to the diesel fuel in a fuel tank proportional to the quantity of diesel fuel added to the fuel tank when refilled to maintain the ratio of the octoate additive to the diesel fuel in the fuel tank at all times.

The invention is an improvement to the system taught by Rao et al in U.S. Pat. No. 4,621,593 which reduces the particulate and gas emission of a light diesel engine into compliance with the 1994 Federal and CARB requirements.

SUMMARY OF THE INVENTION

The invention is a particulate and exhaust gas emissions control system for an automotive vehicle having a fuel tank and a diesel engine. The emissions control system has a particulate trap connectable directly to the exhaust manifold of the diesel engine, an additive tank for storing a fuel additive effective to depress the ignition temperature of the carbon particulates, and means for metering the additive to the fuel tank to maintain the ratio of the fuel additive to the diesel fuel in the fuel tank at a predetermined ratio. The particulate trap has a plurality of parallel inlet and exit channels separated by porous longitudinal side walls which permit the exhaust gases to pass from the inlet channels to the exit channels. The porous longitudinal walls filtering the carbon particulates from the exhaust gases as they pass therethrough forming a particulate layer inside the inlet channels. A layer of catalytic material is disposed in the exit channels which extends at least part way into the pores of the longitudinal side walls. The catalytic material promotes the oxidation of carbon monoxide and unburned hydrocarbons emitted by the diesel engine.

The means for metering is responsive to diesel fuel being added to the fuel tank to meter a quantity of fuel additive into the fuel tank to maintain a desired ratio between the fuel additive and the diesel fuel in the fuel tank at all times.

The quantity of fuel additive stored in the additive tank permits the vehicle to be driven approximately 75,000 miles. After 75,000 miles, the particulate filter is to be serviced and the additive tank refilled with the fuel additive.

One advantage of the particulate and emissions control system is that the carbon particulate is ignited and burned off during normal operation of the vehicle.

Another advantage of the system is that no sensor is required to detect the quantity of carbon particulates collected in the trap and no heating elements are required to ignite the carbon particulates collected by the particulate trap.

Still another advantage of the emissions control system is that the catalyst for oxidizing the carbon monoxide and unburned hydrocarbs is deposited in the exit channels of the particulate trap and the catalyst is not poisoned or covered by excessive quantities of carbon particulate making the catalyst highly effective in removing the unwanted gases from the exhaust.

Still another advantage of the particulate and exhaust gas emissions control system is that it eliminates the requirement for an exhaust gas muffler.

These and other advantages of the particulate and exhaust gas emission control system will become more apparent from a reading of the specification in conjunction with the drawings.

BRIEF DESCRIPTION OF THE DRAWINGS

FIG. 1 is a perspective of an automotive vehicle having the particulate and exhaust gas emissions control.

FIG. 2 is a perspective of the particulate and exhaust gas emission control connected directly to the exhaust manifold of a diesel engine.

BEST MODE FOR CARRYING OUT THE INVENTION

Figure 3:
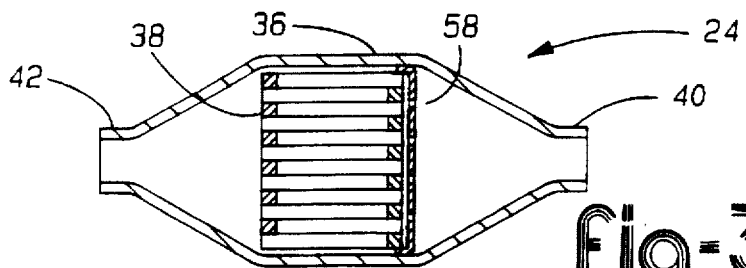
FIG. 3 is a cross section of the particulate trap.

FIG. 1 shows the diesel engine particulate and exhaust gas emission control system installed in an automotive vehicle 10, shown in phantom, having a diesel engine 12. Air is provided to the intake manifold 14 of the engine by means of a turbocharger 16 receiving ambient air through a filter 18 and an air intake conduit 20. The turbocharger 16 is also connected to the engine's exhaust manifold 22 and driven by the exhaust gases emitted from the engine. A particulate trap 24 is connected to the exhaust manifold 22, downstream of the turbocharger 16.

Although the engine 12 illustrated in FIG. 1 is turbocharged, the turbocharger 16 is an accessory which is not required for the operation of the diesel engine particulate and exhaust gas emission control system, and therefore, may be omitted as shown in FIG. 2. In the embodiment shown in FIG. 2, the air intake conduit 20 is connected directly to the air intake manifold 14 and the particulate trap 24 is connected directly to the exhaust manifold 22. An exhaust or tailpipe 26 extends from the particulate trap 24 to the rear of the vehicle 10 as shown.

Fuel for the diesel engine 12 is stored in a fuel tank 28 and is conducted to the engine in a conventional manner. An additive tank 30 is disposed adjacent or in close proximity to the fuel tank 28 and contains a fuel additive which is added to the diesel fuel in the fuel tank 28 by means of connecting line 32. Preferably, the additive tank 28 is disposed in the trunk of the vehicle where it is readily accessible for refilling when necessary. A metering device 34 is attached to the connecting line 32 to provide a measured quantity of fuel additive to the fuel in the fuel tank 28. The measured quantity of the fuel additive is proportional to the quantity of fuel added each time fuel is added to (pumped into) the fuel tank 28.

As taught by Rao in U.S. Pat. Nos. 4,655,037 and 4,670,020, the fuel additive preferably consists a carbon ignition temperature depressing agent effective to promote oxidation of the soot (carbon particulates) collected by the particulate trap 24. The agent comprises a predetermined organometallic compound dissolved in an aerosol-promoting liquid carrier effective to form a fine mist with the organometallic compound and the fuel when sprayed (injected) into the cylinders of the engine to initiate internal combustion.

The predetermined organometallic compound forms a reducible metal oxide as a result of the combustion process in the diesel engine which is co-deposited with the carbon particulate (soot) on the surface of the particulate trap 24. This metal oxide acts as a catalyst reducing the ignition temperature of the carbon particulate collected by the particulate trap to a temperature in the range from 250° to 360° C. (450° to 675° F.).

Preferably, the aerosol-promoting liquid carrier has a boiling point in the range from 80° to 150° C. and may be selected from a group of aerosol liquid carriers consisting of hexane, pentane, and toluene. The organometallic compound is ferrocene, a metal octoate or metal octoate complex with the metal selected from a group consisting of copper, nickel, and cerium. Advantageously, a copper octoate or a copper octoate complex promotes a lower ignition temperature for the carbon particulate collected on the surfaces of the particulate trap 24. More advantageously, copper octoates or a copper octoate complex in combination with nickel or cerium or ferrocene promotes ignition temperatures of the carbon particulates to within the temperature range of the particulate trap under various normal operating engine conditions of the diesel engine. Such organometallic compounds and ferrocene are readily soluble and stable in diesel fuel.

The proportion of the organometallic compound to carrier in the fuel additive is preferably in the range from 1:2 to 1:10 and optimally the quantity of the fuel additive is such that 0.5 gm of the selected octoate or octoate complexes is added to each gallon of fuel.

Approximately 99% of the residue of these organometallic compounds are captured in the particulate trap 24 and remain there until the particulate trap is serviced. Also, there is no evidence that organometallic compounds used in the fuel additive are toxic to humans, animals or plants in their initial or reduced states.

Figure 4:
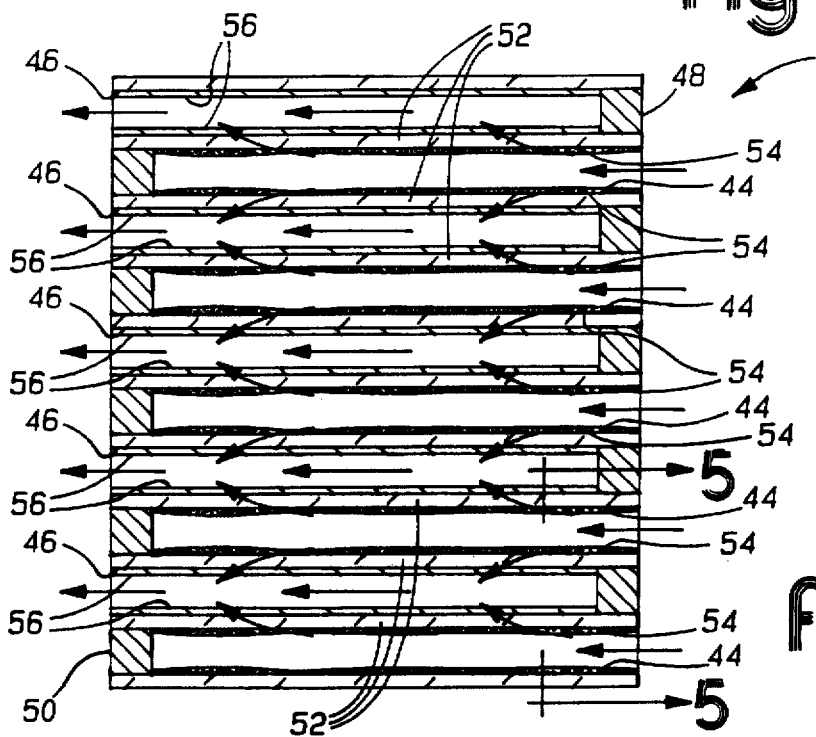
FIG. 4 is an enlarged cross section of the filter element.
Figure 5:
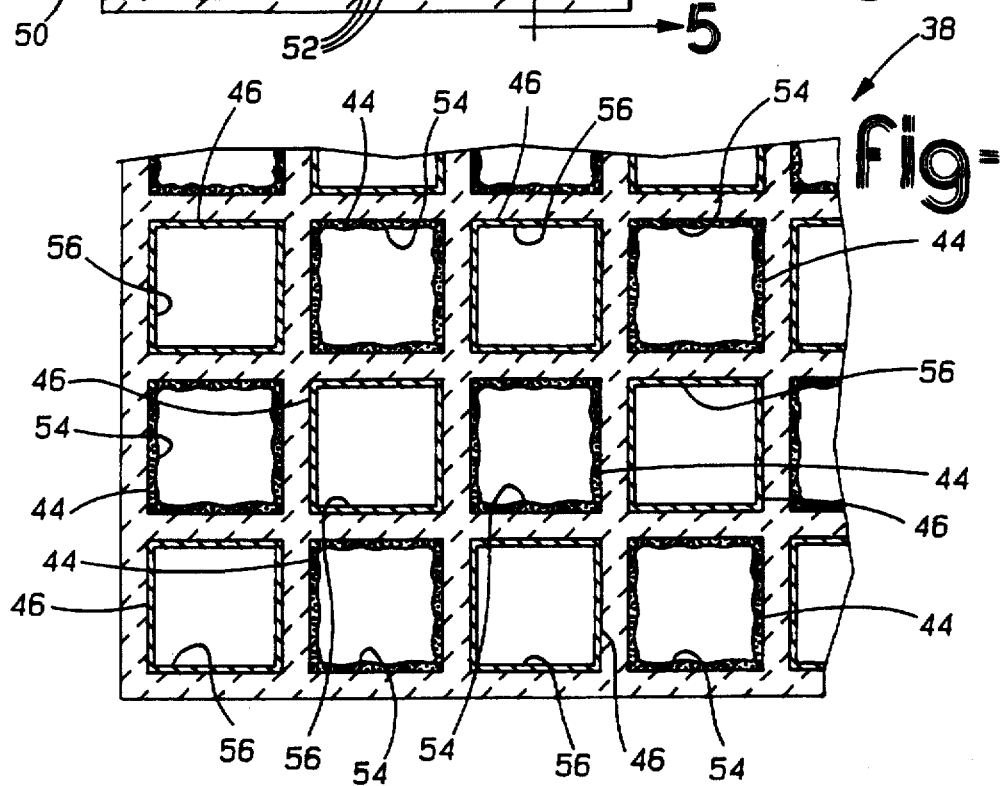
FIG. 5 is a transverse cross section of the filter element.

The details of the particulate trap 24 are shown in FIGS. 3, 4 and 5. Referring first to FIG. 3, the particulate trap 24 consists of a metal housing or canister 36 enclosing a monolithic ceramic filter element 38. The canister 36 has an input collar 40 connectable to the exhaust manifold 22 of the diesel engine and an output collar 42 connectable to the tailpipe 26. As previously indicated in FIGS. 1 and 2, the input of the particulate trap 24 may be connected to the output of a turbocharger 16 (FIG. 1) or it may be connected directly to the exhaust manifold 22 (FIG. 2).

The filter element is composed of a permeable ceramic material, such as cordite®. As shown more clearly in FIGS. 4 and 5, the monolithic filter element 38 has a honeycomb structure consisting of a plurality of parallel channels. The channels are divided into alternating inlet channels 44 and exit channels 46. The inlet channels 44 are open at an inlet end 48 of the filter element 38 and plugged at the exit end 50. Conversely, exit channels 46 are plugged at the inlet end 48 and open at the exit end 50. The inlet and exit channels 44 and 46 are separated by thin porous longitudinal side walls 52 which permit the exhaust gases to pass from the inlet channels 44 to the exit channels 46 along their length. In the preferred embodiment, the inlet and exit channels 44 and 46 have a substantially rectangular cross-sectional shape as shown in FIG. 5. Preferably, the rectangular inlet and exit channels 44 and 46 are approximately eight to twelve inches long, and 0.083 inches wide. However, the length of the inlet and exit channels may range from 2 to 24 inches and their widths may vary from 0.05 to 0.15 inches. The honeycombed monolithic element 38 provides a very large filtration surface area per unit volume significantly reducing the size of the particulate filter.

The porous walls 52 separating the inlet and exit channels 44 and 46 are approximately 0.017 inches thick. The pores in the side walls 52 are small enough to effectively prevent the carbon particulate from passing therethrough so that a layer 54 of carbon particulate and the metal oxide generated by the heating of the organometallic compound in the engine's cylinders are collected on the internal surfaces of the inlet channels 44 as shown.

A thin layer 56 of an oxidation catalyst is deposited on the internal surfaces of the exit channels 46. The oxidation catalyst may be platinum, palladium or a platinum-palladium alloy such as used in current automotive catalytic converters. As is known in the art, platinum, palladium, and alloys thereof are catalysts which promote the oxidation of the hydrocarbons and carbon monoxide byproducts of the combustion of the fuel in the diesel engine 10 reducing the emissions of noxious and undesirable exhaust gases. The position of the oxidation catalyst in the exit channels 46 is highly effective for the removal of noxious and undesirable gases exhausted from the engine because they do not become poisoned or occluded by excessive layers of soot.

The layer of oxidation catalyst 56 formed along the internal side walls of the exit channels also extends at least part way into the pores. In FIGS. 4 and 5, the thickness of the layer of oxidation layer 54 is exaggerated for illustrative purposes only. However, this layer is composed of one or more layers of metal crystal platelets having a width in the range from 100 Å to 400 Å and a thickness of approximately 50 to 100 Å and therefore, is approximately 100 Å to 200 Å thick and does not inhibit the passing of the exhaust gases through the pores of the ceramic filter element. The deposition of the oxidation catalyst in the pores provides a significant increase in its surface area providing a more intimate contact of the exhaust gases with the oxidation layer as the exhaust gases pass from the inlet channels 44 into the exit channels 46 and escape towards the exit end 50 of the filter element 38.

Returning to FIG. 3, the particulate trap may also include one or more exhaust gas dispersion members, such as dispersion member 58 disposed between the input collar 40 and the inlet end 48 of the filter element 38. The dispersion member 58 will have a plurality of slits or apertures which disperse the exhaust gases more uniformly across the inlet end of the filter element 38. In this manner, the carbon particulates carried by the exhaust gases are more uniformly distributed among the plurality of inlet channels of the filter element 38.

In operation, the exhaust gases from the engine 10 are received through the input collar 40 and are uniformly dispersed by the dispersion element 58. As the exhaust gases pass through the porous walls of the inlet channels 44 into the exit channels 46, the carbon particulates and the reducible metal oxide 52 resulting from the combustion in the engine of the fuel along with the fuel additive are filtered from the exhaust gases and form the layer of carbon particulates and metal oxide 54 on the internal surfaces of the inlet channels 44.

When the exhaust gases from the engine heat the surfaces of the filter element to a temperature in the range from 250° to 360° C. (450° to 675° F.) for a period greater than eight seconds, the reducible metal oxide promotes the ignition of the deposited carbon particulates producing carbon dioxide and carbon monoxide gases which now pass through the walls of the inlet channels. In this manner, the deposited carbon particulates are reduced to a gas effectively cleaning the inlet channels.

The gases produced as a result of the combustion of the fuel in the engine and the ignition of the carbon particulates captured by the filter element pass through the longitudinal walls of the filter element from the inlet channels 44 to the exit channels 46 where they react with the catalyst to burn up the excess hydrocarbons and oxidize the carbon monoxide. Because the catalyst is not poisoned or covered by soot, its catalytic action is greater than it would be in a standard unprotected catalytic converter.

As shown in tests conducted by Rao and reported in U.S. Pat. No. 4,670,020, the ignition of the carbon particulate collected by the filter element 38 will occur repeatedly under normal operating conditions of the vehicle so that the back pressure caused by the carbon particulate collected by the filter element will normally be in the range from a back pressure caused by a clean filter element to less than twice the back pressure caused by the clean filter. Effectively, the particulate trap is self-cleaning and maintenance free.

Figure 6:
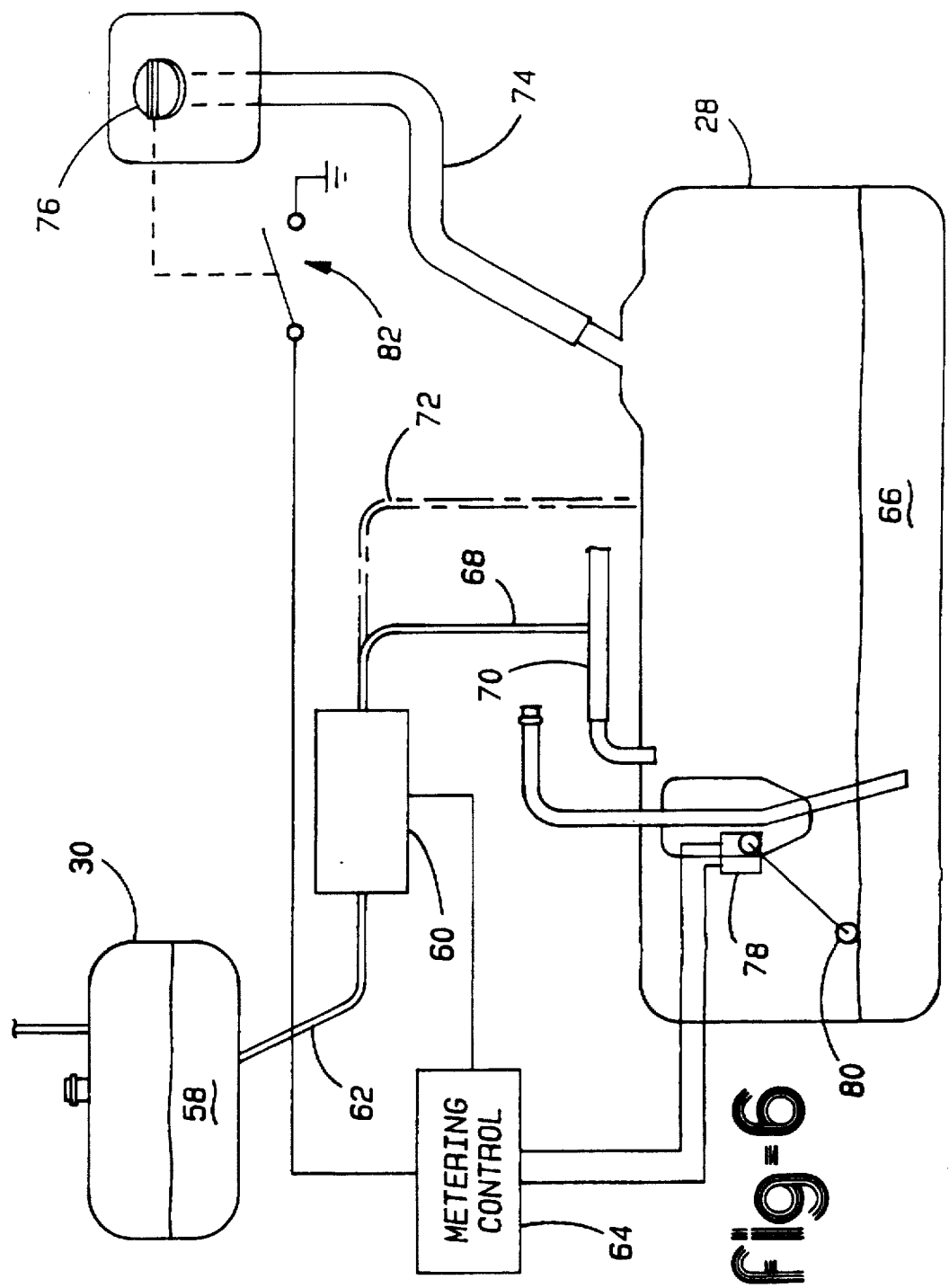
FIG. 6 is a schematic of a first embodiment of the metering mechanism having an electro-mechanical metering device.

Various systems for adding the organometallic additive to the fuel in the vehicle's fuel tank are shown in FIGS. 6 through 9. In FIG. 6, the organometallic additive 58 is stored in an additive tank 30. The additive tank 30 preferably holds two gallons of the organometallic additive 58 which quantity is sufficient for a passenger vehicle to be driven 75,000 miles before servicing of the system and refiling the additive tank. A connecting line 62 connects the additive tank 30 to a metering device 60 which in response to an additive control 64 meters the desired quantity of the organometallic additive to the diesel fuel 66 stored in the fuel tank 28 of the vehicle. The metering device 60 may be an electrically actuated fluid pump or any other type of fluid metering device known in the art. The metered quantity of organometallic additive 58 is conducted to the fuel tank 28 by means of connecting line 68 and fuel return line 70. Alternatively, the organometallic additive may be conducted directly to the fuel tank 28 by a connecting line 72 as shown in phantom.

Diesel fuel is added to the fuel tank 28 by means of a fill pipe 74 which conventionally is closed at the end opposite the fuel tank 28 by a removable cover such as fuel cap 76.

A fuel level sensor 78 having a float 80 generates an electrical signal having a value corresponding to the quantity of diesel fuel 66 in the fuel tank 28. The metering control 64 is responsive to a change in the value of the electrical signal generated by the fuel level sensor 78 to actuate the metering device 60 to deliver to the fuel tank 28 the desired quantity of organometallic additive 58 proportional to the quantity of diesel fuel added to the fuel tank 28.

The metering control 64 will contain averaging circuits which will render it non-responsive to changes in the fuel level in the vicinity of the float 80 due to the sloshing of the fuel during acceleration, deceleration or turning of the vehicle. Alternatively, the metering control 64 may be responsive to the actuation of a switch 82 (shown in phantom) when the fuel cap 76 is removed to add fuel to the fuel tank 28.

Fuel to the engine is pumped from the fuel tank 28 via fuel line 84 in a conventional manner.

In operation, when the metering control 64 detects a change in the value of the electrical signal generated by the fuel level sensor 78 indicating a quantity of fuel has been added to the fuel tank 28, the metering control will add the desired quantity of organometallic additive to the quantity of fuel in the fuel tank 28 proportional to the quantity of fuel that has been added to maintain a desired ratio of the organometallic additive to the diesel fuel. In the preferred embodiment, the desired ratio is in the range from 0.15 to 0.50 grams of organometallic additive per gallon of fuel. Depending upon the ratio of the organometallic additive to the liquid carrier in the organometallic additive, a volume amount of the additive/carrier mixture in the range of 10 to 50 milliliters is added for each gallon of added fuel.

Figure 7:
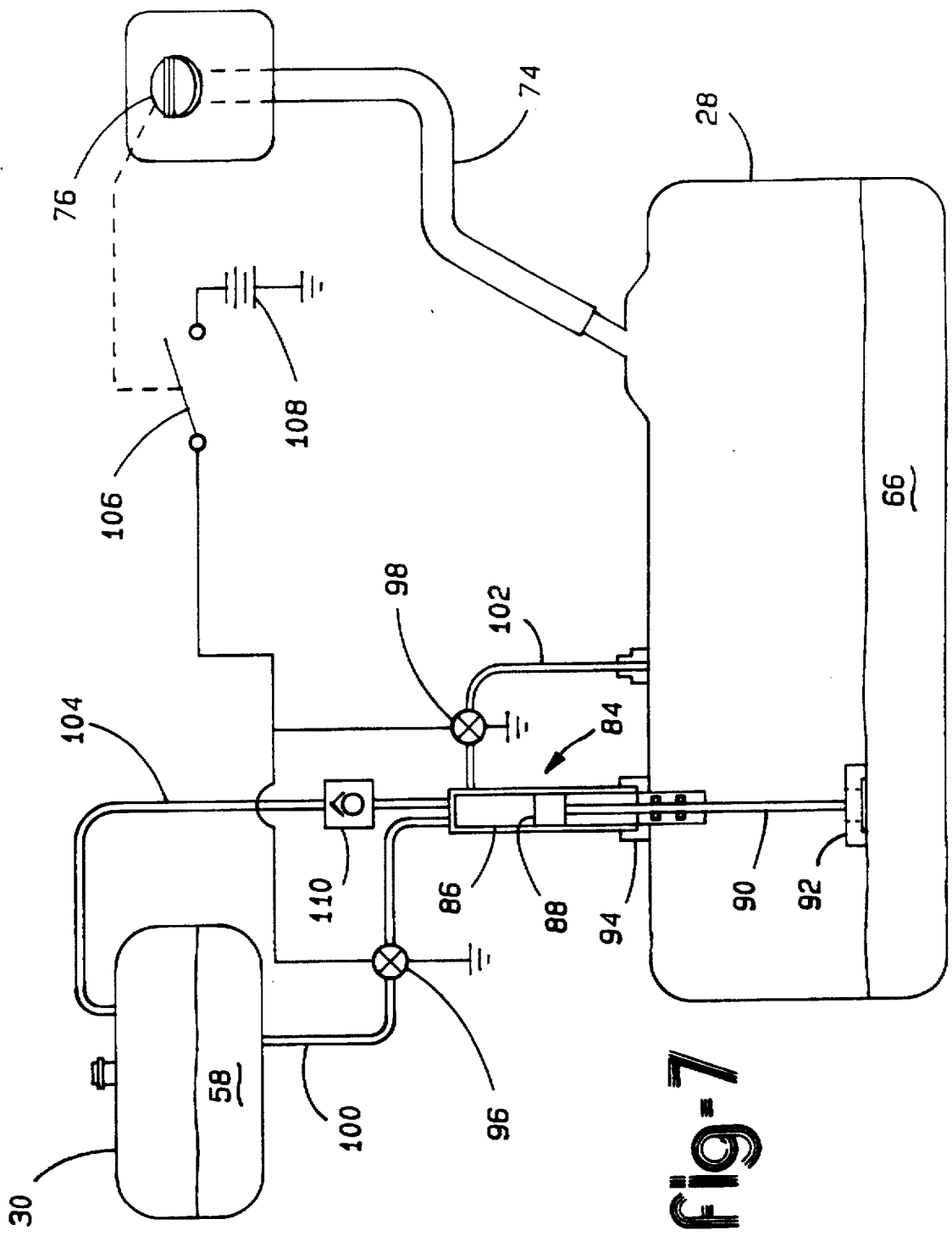
FIG. 7 is a schematic of a second embodiment of the metering mechanism having a hydraulically actuated piston metering device.

In the embodiment shown in FIG. 7, the metering device 60 is a hydro-mechanical metering mechanism 84 having a cylinder 86 mounted to the top of the fuel tank 28 by means of a collar 94. A piston 88 is disposed in the cylinder 86 and connected to a float 92 by means of a piston rod 90. The float 92 floats on the surface of the diesel fuel 66 in the fuel tank 28 and displaces the piston 88 upwards when fuel is added to the fuel tank and displaces the piston downward when fuel is removed from the fuel tank 28 in a conventional manner. A normally open electro-mechanical valve 96 is disposed in the line 100 connecting the additive tank 30 to the input of the hydro-mechanical metering device 84 and a normally closed electro-mechanical valve 98 is connected to connecting line 102 leading from the outlet of the hydro-mechanical pump 84 to the fuel tank 28. A vent line 104 connects the top of the cylinder 86 back to the top of the additive tank 30 to remove any gas that may be trapped in the cylinder 86 between the piston and the top of the cylinder 86.

A normally open electrical switch 106 provides electrical power from the vehicle's source of electrical power, such as battery 108 to the electro-mechanical valves 96 and 98 when the fuel cap 76 is removed from the end of the fill pipe 74. When the fuel cap 76 is removed, switch 106 closes actuating normally open valve 96 to close and actuating normally closed valve 98 to open. As fuel is added to the fuel tank 28, the float 92 will rise displacing the piston 88 upwardly. The upward displacement of the piston 88 will pump the organometallic additive contained in the cylinder 86 into the fuel tank through the now open normally closed valve 98. The activated normally open valve 96 prevents the organometallic additive from being pumped by piston 88 back into the additive tank 30. When the height of the additive tank 30 above the fuel tank 28 is not sufficient to prevent the organometallic additive to be pumped back into the additive tank 30 via the vent line 104, a check valve 110 may be included in the vent line 104. The check valve 110 will normally remain open under low pressure conditions to allow gases accumulated in the cylinder 86 to be vented to the additive tank but will close in response to the fluid pressure generated by the rising of the piston 88 in response to adding fuel to the fuel tank 28.

The cross-sectional area defined by the internal diameter of the cylinder 86 is selected to be proportional to the cross-sectional area of the fuel tank 28 so that as fuel is added to the fuel tank 28, the quantity of organometallic additive pumped by the rising of piston 88 in the cylinder 86 will have the desired volumetric ratio of fuel additive to fuel.

Figure 8:
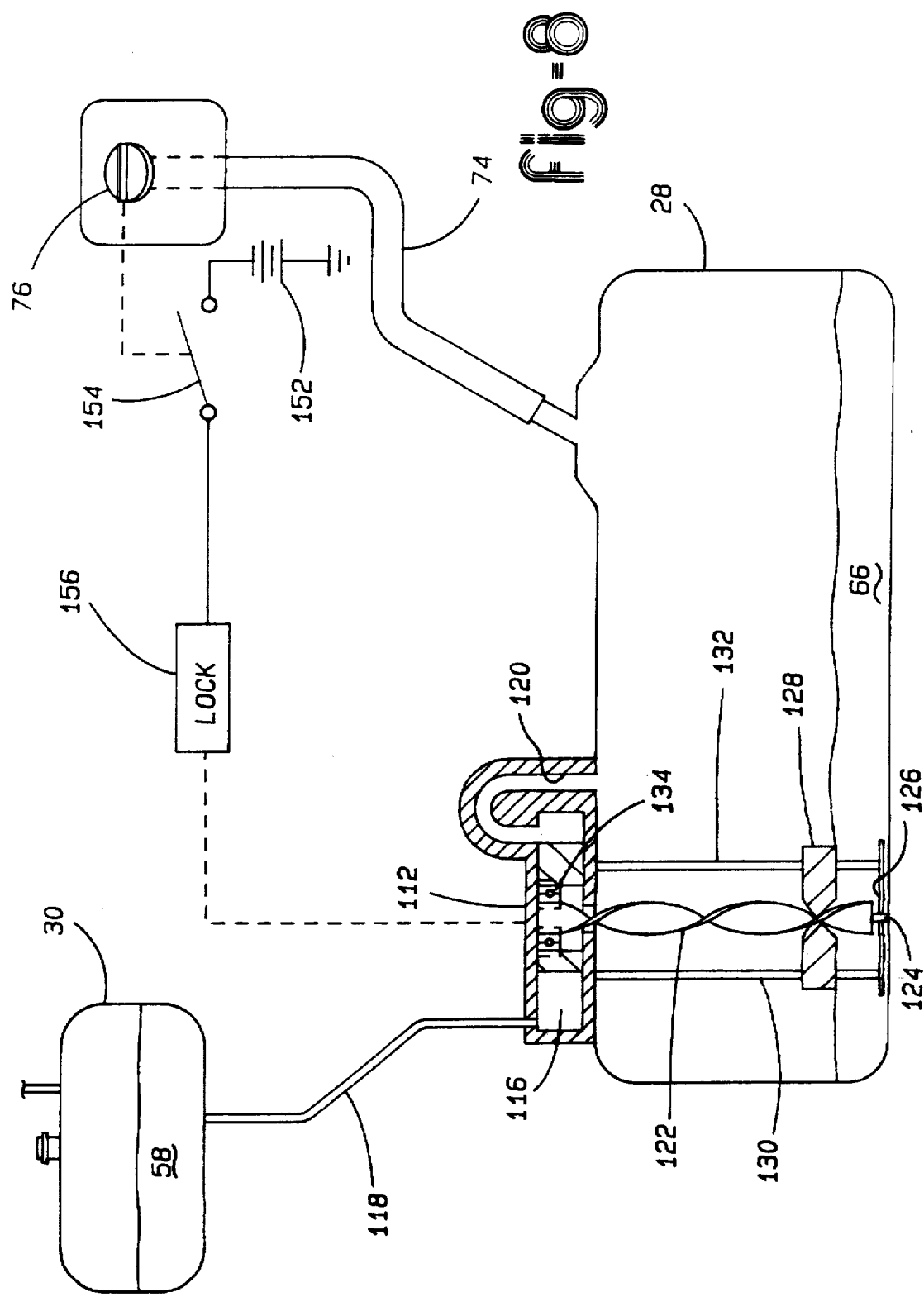
FIG. 8 is a schematic of a third embodiment of the metering mechanism having a hydro-mechanically driven vane type metering device.

In the embodiment shown in FIG. 8, the metering device is a vane type metering device 112 of conventional design mounted to the top of the fuel tank 28. The vane type metering device 112 has an offset rotor 114 and a plurality of vanes 116. Organometallic additive 58 from the additive tank 30 is conducted to the inlet of the vane type metering device 112 by a connector line 118. The outlet of the vane type metering device 112 is connected directly to fuel tank 28 by a U-shaped channel 120. The offset rotor 114 of the vane type metering device is connected to one end of a spiral shaft 122. The other end of the spiral shaft 122 has an axle 124 rotatably received in a stationary base 126 adjacent to the bottom of the fuel tank 28. A float member 128 is guided by a pair of vertically oriented guide bars 130 and 132 connected between the vane pump 112 and the stationary base 126. The float member is slidably connected to the spiral shaft 122 in such a way that the vertical displacement of the float member 128 will rotate the spiral shaft 122 and the offset rotor 114 of the metering device. The spiral shaft 122 is preferably connected to the offset rotor 114 by means of a unidirectional clutch or coupling 134 which decouples the spiral shaft 120 from the offset rotor 114 when the spiral shaft is rotated in the opposite direction by the float member 128 descending as fuel is pumped from the fuel tank 28. The metering device 112 provides the required quantity of organometallic additive to the fuel tank 28 each time fuel is added.

An electro-mechanical locking mechanism 156 may be used to inhibit the rotation of the spiral shaft 122 or the offset rotor 114 due to sloshing of the fuel in the fuel tank 28 due to acceleration, deceleration or turning when the fuel cap is attached to the fuel tank 28. The electromechanical locking mechanism 156 is energized to release the spiral shaft or offset rotor 114 by a switch 154 closed in response to the removal of the fuel cap. Switch 154 connects the vehicle's source of electrical power, illustrated by battery 152, to the locking mechanism 156 when the fuel cap is removed prior to pumping fuel into the fuel tank and disconnects the locking mechanism 156 from the battery 152 when the fuel cap is returned. Alternatively, the switch 154 may be actuated by opening the fuel cap access door 77 covering the fuel cap 76 when the vehicle is equipped with such a door.

Figure 9:
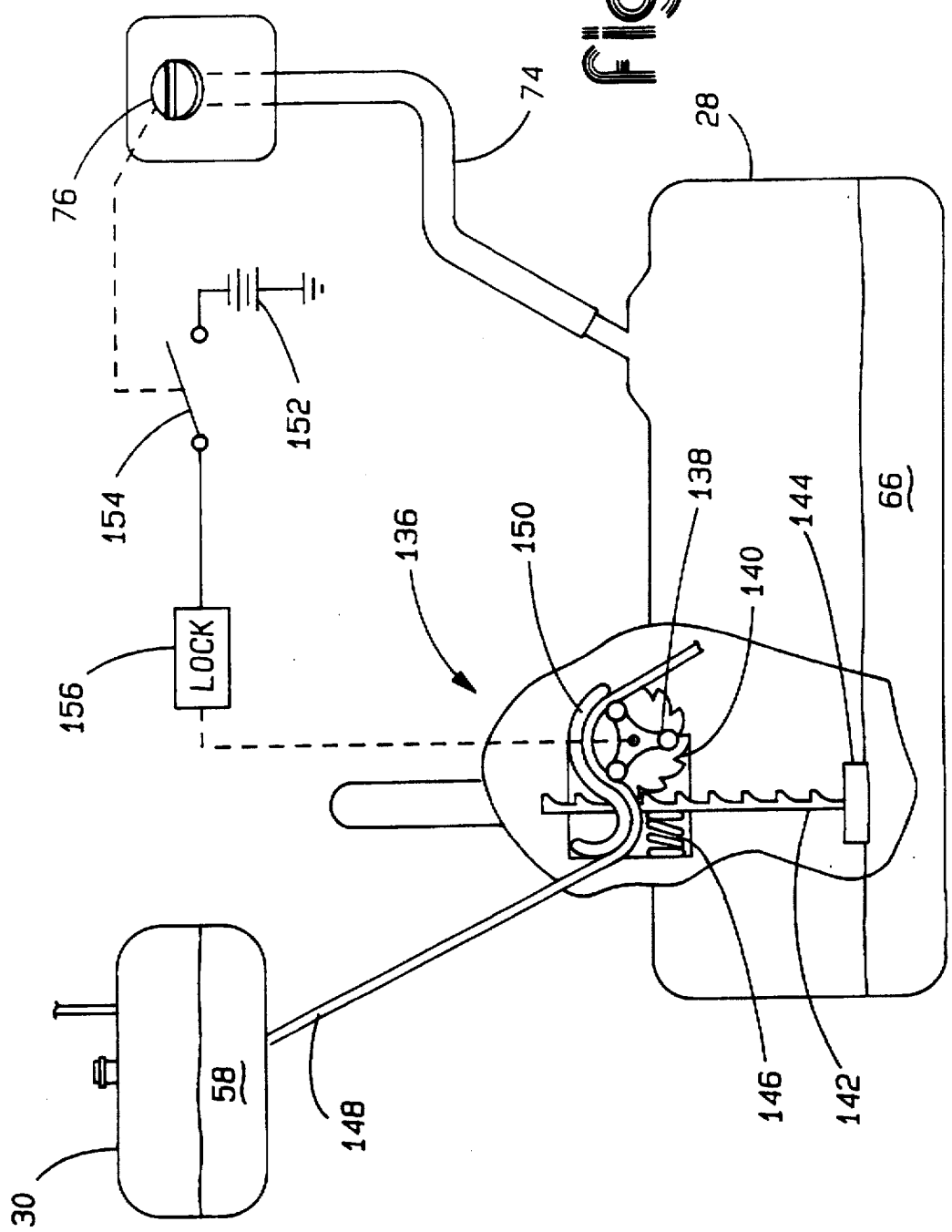
FIG. 9 is a schematic of a third embodiment of the metering mechanism having a hydro-mechanically driven peristaltic metering mechanism.

FIG. 9 shows an alternate type of metering device for dispensing the required quantity of the organometallic additive to the diesel fuel in response to adding diesel fuel to the fuel tank. In this embodiment, a peristaltic multiple lobe metering device 136 has a plurality of lobes 138 attached to a ratchet gear 140. The ratchet gear 140 is rotated by a rack 142 attached to a float 144. The rack 142 is biased against the ratchet gear 140 by a spring 146 so that the rack 142 will rotate the ratchet gear 140 in response to a vertical displacement of the float 144 as the gas tank 28 is being filled. However, the rack 142 will be displaced away from the ratchet gear 140 against the force of spring 146 as the rack 142 is displaced in a downward direction as fuel is pumped from the fuel tank. The organometallic additive is conducted to the fuel tank 28 by means of a flexible tubing 148 which passes between the lobes 138 and an S-shaped backing plate 150. As the lobes 138 rotate with the ratchet gear 140, rollers attached to the end of each lobe compress the flexible tubing 148 against the backing plate 150 dispensing a quantity of the organometallic additive into the fuel tank 28 as the lobes rotate proportional to the quantity of diesel fuel added.

As in the embodiment discussed relative to FIG. 8, an electromechanical locking mechanism 156 may be used to inhibit the rotation of the ratchet gear 140 due to the sloshing of the fuel in the gas tank 28. The locking mechanism 156 is activated to release the ratchet gear 140 in response to the application of electrical power from the vehicle's source of electrical power, illustrated as battery 152, by the closing of switch 154.

As previously described, the switch 154 is closed in response to removing the fuel cap 76 from the fill pipe 74. The locking mechanism 156 permits the addition of the organometallic additive into the fuel tank only when the fuel cap 76 is removed to add fuel to the fuel tank.

The particulate trap 24 can advantageously also be used with spark ignited gasoline powered engines. The emissions control system will take the form shown in FIG. 2 where the engine 12 is a spark ignited internal combustion gasoline engine rather than a diesel engine as previously described. As is known in the art, a rich air/fuel mixture is provided to the engine to facilitate a cold start. This rich air/fuel mixture has more fuel (gasoline) than can be consumed by the combustion process in the engine's cylinders. As a result, raw gasoline and excessive quantities of hydrocarbons are contained in the exhaust. In addition, when the engine is cold, the seal between the pistons and the walls of the cylinders provided by the piston rings is less than desired and permits a small quantity of unburned lubricating oil to be introduced into the exhaust. This unburned oil contains zincthiophosphate (ZTP) which poisons the oxidation catalyst in the catalytic converter of the vehicle.

The particulate trap 24 is connected to the exhaust manifold 22 of the gasoline engine as shown. During a cold start, the raw gas, unburned hydrocarbons and oil contained in the exhaust gases will be filtered out and collected on the internal surfaces of the inlet channels of the porous ceramic filter element 38 in the same manner as the carbon particulates in the exhaust gases of a diesel engine were filtered and collected. After the engine has started, the fuel enrichment of the air/fuel mixture being supplied to the engine is gradually terminated using a predetermined schedule. As the ceramic filter element 38 is heated by the exhaust gases from the engine, the raw gas and unburned hydrocarbons will evaporate and the oil will decompose leaving behind the zincthiophosphate residue on the internal surfaces of the inlet channel. This filtering of the raw gas, unburned hydrocarbons, and oil protects the oxidation catalyst 56 from being poisoned, or coated with raw gas and oil making the catalytic surfaces in the exit channels more effective in removing the carbon monoxide, unburned hydrocarbons and other objectionable gas from the exhaust.

Having disclosed the invention and various mechanisms for metering the desired quantity of a organometallic additive to the fuel in the vehicle's fuel tank to maintain a predetermined ratio between the amount of organometallic additive and fuel in the fuel tank at all times, it is understood that those skilled in the art may conceive alternate mechanisms and improvements thereto within the spirit of the invention as set forth in the appended claims.

We claim:

1. A particulate and exhaust gas emission control system for an automotive vehicle having a fuel tank and a diesel engine, said control system comprising:

a particulate trap connectable to an exhaust manifold of said diesel engine, said particulate trap having a plurality of parallel inlet and outlet channels separated by porous longitudinal walls, said porous longitudinal walls permitting the exhaust gases to pass from said inlet channels to said outlet channels, said inlet channels collecting therein the carbonaceous particulates contained in the exhaust gases and said outlet channels having a thin layer of a catalytic metal disposed directly on the surfaces of said porous longitudinal walls along the length thereof to promote the oxidation of carbon monoxide and unburned hydrocarbons in the exhaust gases, said layer of catalytic metal extending into the pores of said porous longitudinal walls so as to increase the surface area of said catalytic metal to said exhaust gases;

an additive tank for storing a fuel additive effective to depress the ignition temperature of the carbonaceous particulates collected in the particulate trap; and metering means for metering said fuel additive to said fuel tank in response to fuel being added to said fuel tank, said metering means adding a quantity of said fuel additive to said fuel tank proportional to the quantity of fuel added to maintain a predetermined ratio between said fuel additive and said fuel in said tank.

2. The control system of claim 1 wherein said particulate trap is a porous ceramic honeycomb structure.

3. The control system of claim 1 wherein said catalytic metal is selected from a group of metals consisting of platinum, palladium, and alloys thereof.

4. The control system of claim 1 wherein said fuel additive is an organometallic compound in an aerosol-promoting liquid carrier.

5. The control system of claim 4 wherein said organometallic compound is at least one metal octoate having a metal selected from the group consisting of copper, nickel and cerium.

6. The control system of claim 4 wherein said aerosol-promoting liquid carrier is selected from the group consisting of hexane, pentane and toluene.

7. The control system of claim 1 wherein said vehicle includes a closure which is required to be opened to add fuel to said fuel tank, said means for metering comprising:

means for detecting said closure being open to generate a fill signal;

means for detecting the quantity of fuel added to the fuel tank to generate a fuel quantity signal;

a metering control for generating an additive quantity signal in response to said fill signal and said fuel quantity signal, said additive quantity signal having a value proportional to the quantity of fuel added to said fuel tank; and a metering device for metering said quantity of fuel additive from said additive tank to said fuel tank in response to said additive quantity signal.

8. The control system of claim 1 wherein said vehicle has a closure required to be opened to add fuel to said fuel tank, said means for metering comprising:

a metering device having a cylinder, a piston disposed in said cylinder, and at least one port;

a normally open valve conducting said fuel additive from said additive tank to said at least one port;

a normally closed valve connecting said at least one port to said fuel tank;

means for activating said normally open valve to a closed state and said normally closed valve to an open state in response to said closure being open; and a float connected to said piston, said float displacing said piston a distance proportional to the quantity of fuel added to said fuel tank, said displacing of said piston with said normally open valve closed and said normally closed valve open adding said quantity of said fuel additive to said fuel tank to maintain said predetermined ratio.

9. The control system of claim 1 wherein said means for metering comprises:

a vane type metering device attached to said fuel tank, said vane type metering device having an inlet connected to said additive tank, an outlet connected to said fuel tank, a rotor, and a plurality of vanes attached to said rotor;

a spiral shaft connected to said rotor; and float means slidably connected to said spiral shaft, said float means rotating said spiral shaft in response to adding fuel to said fuel tank, said float means rotating said spiral shaft and said rotor through an angle proportional to the quantity of fuel added causing said vane type metering device to meter said quantity of said fuel additive into said fuel tank to maintain said predetermined ratio of said fuel additive to said fuel in said fuel tank.

10. The control system of claim 9 wherein said vehicle has a closure required to be opened to add fuel to said fuel tank, said means for metering comprising:

a lock mechanism having a locked state inhibiting the rotation of said rotor and an unlocked state permitting the rotation of said rotor; and means for activating said lock mechanism to said unlocked state in response to said closure being open.

11. The control system of claim 9 wherein said means for metering further includes a unidirectional clutch connected between said rotor and said spiral shaft permitting said spiral shaft to rotate said rotor in only a predetermined direction.

12. The control system of claim 1 wherein said means for metering comprises:

a peristaltic metering device connecting said additive tank to said fuel tank, said peristaltic metering device having a multi-lobed rotor;

a ratchet gear attached to said multi-lobed rotor;

a float disposed in said fuel tank; and a rack connected between said float and said ratchet gear, said rack rotating said ratchet gear in a predetermined direction in response to fuel being added to said fuel tank, said rotation of said ratchet wheel actuating said peristaltic metering device to meter said quantity of said fuel additive from said additive tank to said fuel tank to maintain said predetermined ratio between fuel additive and said fuel in said fuel tank.

13. The control system of claim 12 wherein said vehicle has a closure required to be opened to add fuel to said fuel tank, said means for metering comprising:

a lock mechanism having a locked state inhibiting the actuation of said peristaltic metering device by said float and an unlocked state permitting the displacement of said float in response to fuel being added to said fuel tank; and means for actuating said lock mechanism to said unlocked state permitting said float to actuate said peristaltic metering device in response to said closure being open.

14. A particulate and exhaust gas emission control system for a vehicle having a diesel engine and a fuel tank storing diesel fuel for powering the diesel engine, said control system comprising:

a particulate trap connectable to an exhaust manifold of said diesel engine, said particulate trap having a porous ceramic filter structure for collecting carbon particulates from the exhaust gases emitted by said diesel engine, said particulate trap located relative to said exhaust manifold a distance predetermined for said exhaust gases to heat said porous ceramic structure to within a predetermined temperature range under at least one operating state of said diesel engine, said porous ceramic filter structure being a honeycomb structure having a plurality of inlet and outlet channels separated by porous longitudinal walls having pores permitting the exhaust gases to pass from said inlet channels to said outlet channels, said carbon particulates being collected on the surfaces of said inlet channels, said porous longitudinal walls of said outlet channels having a thin layer of a metal having catalytic properties deposited directly on the surfaces thereof and into said pores to promote the oxidation of carbon monoxide and unburned hydrocarbons in the exhaust gases, said layer of metal having catalytic properties selected from the group consisting of platinum, palladium, and alloys thereof and extending substantially the length of said longitudinal walls;

an additive tank for storing a fuel additive effective to depress the ignition temperature of the collected carbon particulates to said predetermined temperature range; and means for metering said fuel additive from said additive tank to said fuel tank in response to adding fuel to said fuel tank to maintain a predetermined ratio of said fuel additive to the fuel in said tank.

15. The emissions control system of claim 14 wherein said vehicle has a closure required to be opened to add diesel fuel to said fuel tank, said means for metering comprising:

means responsive to said closure means being open to generate a fill signal;

a fuel level sensor for generating a fuel quantity signal having a value indicative of the quantity of diesel fuel in the fuel tank;

means for generating a fuel additive signal in response to said fill signal and a change in said value of said fuel quantity signal; and means for metering a quantity of fuel additive from said additive tank to said fuel tank to maintain said predetermined ratio of said fuel additive to said diesel fuel in said fuel tank.

16. The emissions control system of claim 15 wherein said vehicle includes a closure which is required to be open to add diesel fuel to said fuel tank, said means for metering comprises:

a fluid metering device having a cylinder, a piston slidably disposed in said cylinder and at least one port;

a normally open valve conducting said fuel additive from said additive tank to said at least one port;

a normally closed valve connecting said at least one port to said fuel tank;

means for actuating said normally open valve to a closed state and for actuating said normally closed valve to an open state in response to said closure being open;

a float connected to said piston, said float displacing said piston a distance proportional to the quantity of diesel fuel added to said fuel tank, said displacing of said piston by said float adding a quantity of additive to said diesel fuel in said fuel tank when said normally open valve is in said closed state and said normally closed valve is in said open state in response to said closure being open, said quantity of fuel additive maintaining said predetermined ratio of said fuel additive to said diesel fuel in said fuel tank.

17. The emission control system of claim 15 wherein said means for metering comprises:

a vane type metering device attached to said fuel tank, said vane type metering device having an inlet connected to said additive tank, an outlet connected to said fuel tank, a rotor and a plurality of vanes attached to said rotor;

a spiral shaft connected to said rotor; and float means slidably connected to said spiral shaft, said float means angularly rotating said spiral shaft in response to adding diesel fuel to said fuel tank, said float means rotating said spiral shaft and said rotor through an angle proportional to the quantity of diesel fuel added to said fuel tank causing said vane type metering device to meter a quantity of said fuel additive into said fuel tank to maintain said predetermined ratio of said fuel additive to said diesel fuel in said fuel tank.

18. The emission control system of claim 17 wherein said vehicle includes a closure which is required to be opened to add diesel fuel to said fuel tank, said means for metering further comprising:

a lock mechanism having a locked state inhibiting the rotation of said rotor and an unlocked state permitting the rotation of said rotor; and means for actuating said lock mechanism to said unlocked state in response to said closure being open.

19. The emission control system of claim 18 wherein said closure is a door enclosing a fuel cap covering an opening through which fuel may be added to said fuel tank.

20. The emission control system of claim 18 wherein said closure is a fuel cap covering an opening to said fuel tank through which fuel may be added to said fuel tank.

21. The emission control system of claim 18 further including a unidirectional drive mechanism connected between said spiral shaft and said rotor of said vane type metering device.

22. The emission control system of claim 14 wherein said means for metering comprises:

a peristaltic metering device connecting said additive tank to said fuel tank, said peristaltic metering device having a multi-lobe rotor;

a ratchet gear attached to said multi-lob rotor of said peristaltic metering device and rotatable therewith;

a float disposed in said fuel tank; and a rack connected to said float and resiliently engageable with said ratchet gear, said rack rotating said ratchet gear in a predetermined direction in response to diesel fuel being added to said fuel tank, said rotation of said ratchet gear actuating said peristaltic metering device to meter a quantity of fuel additive from said additive tank to said fuel tank to maintain said predetermined ratio between said fuel additive and said diesel fuel in said fuel tank.

23. The emission control system of claim 22 wherein said vehicle includes a closure which is required to be opened to add diesel fuel to said fuel tank, said means for metering further comprises:

a lock mechanism having a locked state inhibiting the rotation of said multi-lobed rotor of said peristaltic metering device and an unlocked state permitting the rotation of said multi-lobed rotor; and means for actuating said lock mechanism to said unlocked state in response to said closure being open.

24. The emission control system of claim 23 wherein said fuel tank has a fuel cap, the removal of which permits fuel to be added to said fuel tank, said closure is a door covering said fuel cap.

25. The emission control system of claim 23 wherein said closure is a fuel cap removably attached to said fuel tank, said fuel cap covering an opening in said fuel tank through which diesel fuel from an external source can be added to the diesel fuel in said fuel tank.

26. The emission control system of claim 14 wherein said fuel additive comprises at least one metal octoate dissolved in an aerosol-promoting liquid carrier.

27. The emission control system of claim 26 wherein said at least one octoate has a metal selected from the group consisting of copper, nickel and cerium and said aerosol-promoting liquid carrier is selected from the group comprising hexane, pentane and toluene.

28. A filter element for reducing the undesirable exhaust emissions of an internal combustion engine, said filter element comprising a porous filter structure having a plurality of interleaved parallel inlet and exit channels separated by longitudinal porous walls, said porous longitudinal side walls having pores therethrough permitting the exhaust gases to pass from said inlet channels to said exit channels, said inlet channels collecting therein any raw gas, unburned hydrocarbons, and oil contained in said exhaust gases and said exit channels having a thin layer of a metal oxidation catalyst disposed directly on said porous walls and extending into said pores to increase the surface of said metal oxidation catalyst exposed to the exhaust gases.

29. The filter element of claim 28 wherein said metal oxidation catalyst is selected from the group of metals consisting of platinum, palladium and alloys thereof.

30. The filter element of claim 28 further including a canister enclosing said porous filter element, said canister including means for conducting said exhaust gas from said exhaust manifold of said internal combustion engine to said inlet channels of said porous filter element.

31. The filter element of claim 28 wherein said porous filter structure is a monolithic porous ceramic structure.

\* \* \* \* \*